(12) United States Patent
Qian et al.

(10) Patent No.: US 10,901,546 B2
(45) Date of Patent: Jan. 26, 2021

(54) DISPLAY PANEL, DISPLAY DEVICE, AND PRESSURE SENSING METHOD

(71) Applicant: Shanghai Tianma Micro-Electronics Co., Ltd., Shanghai (CN)

(72) Inventors: Xu Qian, Shanghai (CN); Feng Lu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 132 days.

(21) Appl. No.: 15/699,721

(22) Filed: Sep. 8, 2017

(65) Prior Publication Data
US 2017/0371472 A1 Dec. 28, 2017

(30) Foreign Application Priority Data
Jun. 30, 2017 (CN) .......................... 2017 1 0522325

(51) Int. Cl.
*G06F 3/041* (2006.01)
*G02F 1/1333* (2006.01)
*G06F 3/045* (2006.01)
*G06F 3/047* (2006.01)

(52) U.S. Cl.
CPC ........ *G06F 3/0414* (2013.01); *G02F 1/13338* (2013.01); *G06F 3/045* (2013.01); *G06F 3/047* (2013.01); *G06F 3/0412* (2013.01); *G06F 3/0416* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2012/0299866 A1* | 11/2012 | Pao | ......................... | G06F 3/044 345/174 |
| 2013/0076646 A1* | 3/2013 | Krah | ..................... | G06F 3/0414 345/173 |
| 2017/0003811 A1* | 1/2017 | Lu | .......................... | G06F 3/0416 |
| 2017/0010740 A1* | 1/2017 | Chuang | ................. | G06F 3/0416 |
| 2017/0192562 A1* | 7/2017 | Zhou | ..................... | G06F 3/0414 |
| 2017/0220180 A1* | 8/2017 | Lu | .......................... | G06F 3/0412 |
| 2017/0308221 A1* | 10/2017 | Li | ......................... | G02B 6/0051 |
| 2018/0046275 A1* | 2/2018 | Haran | ................... | G06F 3/0414 |

(Continued)

FOREIGN PATENT DOCUMENTS

CN 105867699 A * 8/2016 .......... G06F 3/0416

*Primary Examiner* — Benjamin X Casarez
(74) *Attorney, Agent, or Firm* — Anova Law Group PLLC

(57) ABSTRACT

A display panel, a display device, and a pressure sensing method are provided. The display panel includes a display region, a non-display region, a scanning driving circuit in the non-display region, a plurality of scanning lines extending in a first direction and being arranged in a second direction, and at least one pressure sensing unit. Each of the scanning lines is connected to one of output terminals of the scanning driving circuit and the first direction is perpendicular to the second direction. Each pressure sensing unit includes a first input terminal, a second input terminal, and a first output terminal. The first input terminal and the second input terminal are connected to different output terminals of the scanning driving circuit respectively, and the first output terminal is used for outputting a pressure sensing signal.

14 Claims, 11 Drawing Sheets

(56) References Cited

U.S. PATENT DOCUMENTS

| | | | |
|---|---|---|---|
| 2018/0046277 A1* | 2/2018 | Ding | G06F 3/04144 |
| 2018/0059820 A1* | 3/2018 | Tanemura | G06F 3/041 |
| 2018/0348917 A1* | 12/2018 | Wang | G06F 3/14 |
| 2018/0348944 A1* | 12/2018 | Lu | G06F 3/0416 |

* cited by examiner

DISPLAY PANEL, DISPLAY DEVICE, AND PRESSURE SENSING METHOD

CROSS-REFERENCES TO RELATED APPLICATION

This application claims the priority of Chinese Patent Application No. 201710522325.X, filed on Jun. 30, 2017, the content of which is incorporated by reference in its entirety.

TECHNICAL FIELD

The present disclosure generally relates to the field of display technologies and, more particularly, relates to a display panel, a display device, and a pressure sensing method.

BACKGROUND

Currently, display panels with touch function have been widely used as information input tools in cell phones, tablet PCs, information query machines in lobbies of public spaces and other display products.

To better meet the need of users, a pressure sensing unit usually is disposed in a touch display panel to detect a magnitude of a touch pressure when a user touches the touch display panel. The display panel can capture position information and pressure magnitudes of touches, which enriches the applications of touch display technology. The pressure sensing unit usually is made of resistance bridges and outputs pressure sensing signals based on input signals in input terminals, thus a driving circuit in the display panel or an external circuit is necessary to provide bias signals. Also, metal wires have to be formed to connect the driving circuit and the pressure sensing unit. Thus, the design of the display panel becomes very complex. Moreover, the driving circuit and metal wires will occupy a part of sides of the display panel.

The disclosed display panel, and display device and pressure sensing method thereof are directed to solve one or more problems set forth above and other problems.

SUMMARY

One aspect of the present disclosure provides a display panel. The display panel includes a display region, a non-display region, a scanning driving circuit in the non-display region, a plurality of scanning lines each extending in a first direction and arranged in a second direction, and at least one pressure sensing unit. Each scanning line is connected to one of output terminals of the scanning driving circuit and the first direction is perpendicular to the second direction. Each pressure sensing unit includes a first input terminal, a second input terminal, and a first output terminal. For each pressure sensing unit, the first input terminal and the second input terminal is connected to different scanning signal output terminal respectively, and the first output terminal is used to output pressure sensing signals.

Another aspect of the present disclosure provides a display device. The display device includes a plurality of the display panel provided by any embodiment of the present disclosure.

Another aspect of the present disclosure provides a pressure sensing method to detect touch pressures on the display panel provided by any embodiment of the present disclosure. The pressure sensing method includes: when the output terminal of the scanning driving circuit connected to the first input terminal of each pressure sensing unit provides the scanning signal, detecting a first pressure sensing signal on the first output terminal of each pressure sensing unit; when the output terminal of the scanning driving circuit connected to the second input terminal of each pressure sensing unit provides the scanning signal, detecting a second pressure sensing signal on the first output terminal of each pressure sensing unit; and based on the first and the second pressure sensing signal, determining the magnitude of the pressure.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
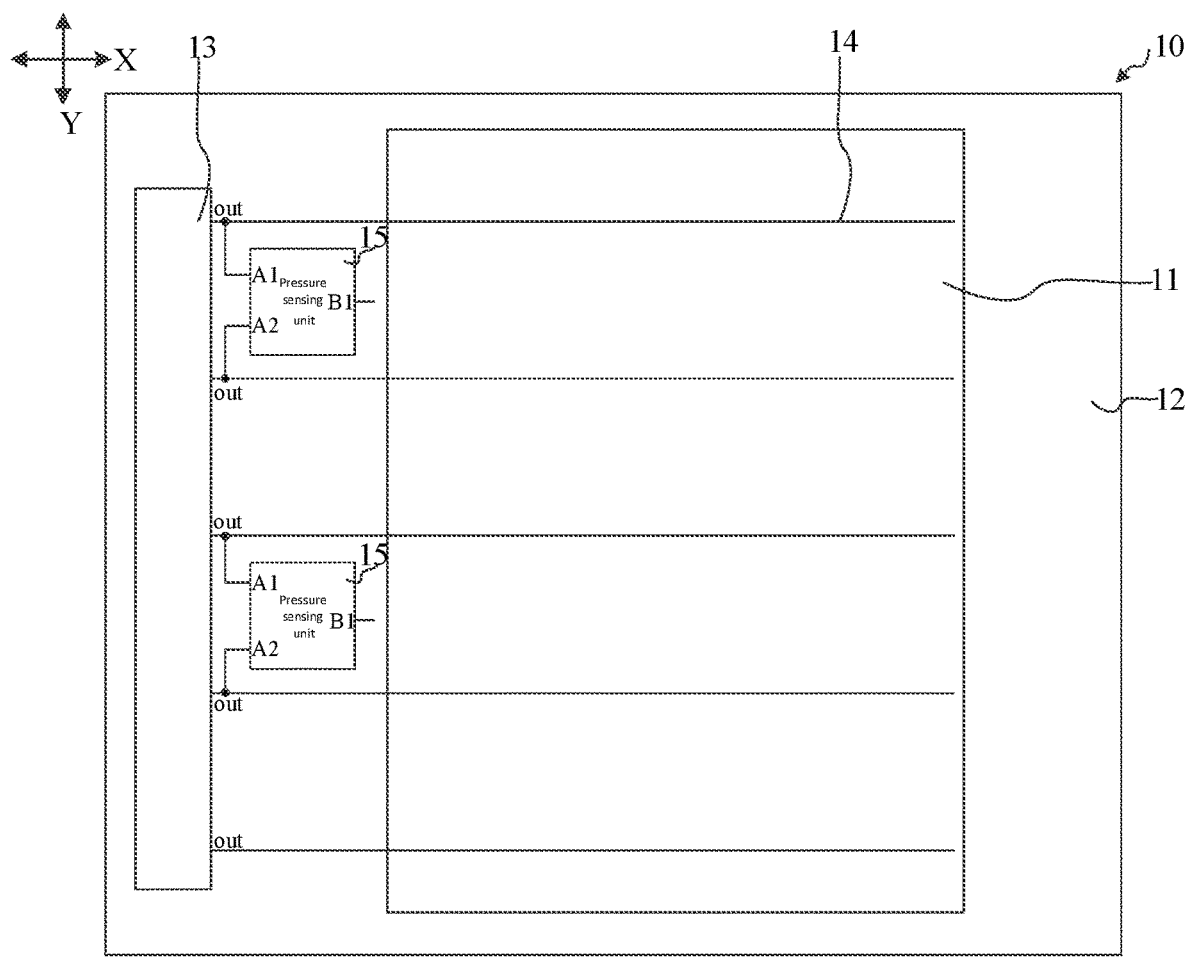
FIG. 1A illustrates an exemplary structure of a display panel consistent with disclosed embodiments.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the invention. Furthermore, a three-dimensional size including length, width and depth should be considered during practical fabrication.

FIG. 1A illustrates an exemplary structure of a display panel consistent with disclosed embodiments. As illustrated in FIG. 1A the display panel 10 may include a display region 1, a non-display region 12, a scanning driving circuit 13 in the non-display region 12, a plurality of scanning lines 14, and at least one pressure sensing unit 15.

Each scanning line in the display panel 10 may extend in a first direction X and may be arranged in a second direction Y, wherein the first direction X may be perpendicular to the second direction Y. Each scanning line 14 may be connected to one of output terminals of the scanning driving circuit 13.

Each pressure sensing unit 15 in the display panel 10 may include a first input terminal A1, a second input terminal A2, and a first output terminal B1. The first input terminal A1 and the second input terminal A2 of each pressure sensing unit 15 may be connected to different output terminals of the scanning driving circuit 13 respectively, as shown in FIG. 1A. In FIG. 1A only two pressure sensing units 15 and the corresponding output terminals of the scanning driving circuit 13 are shown for illustrative purpose and the embodiments of the present disclosure may include a plurality of pressure sensing unit 15 and a plurality of output terminal of the scanning driving circuit 13.

In the disclosed embodiments, the scanning driving circuit 13 of the display panel 10 may include n output terminals (i.e., a first output terminal 'out1', a second output terminal 'out2' . . . and an n-th output terminal 'outn'), where n is an integer. The first input terminal A1 of the first pressure sensing unit may be connected to the first output terminal 'out2' of the scanning driving circuit 13, and the second input terminal A2 may be connected to the second output terminal 'out2' of the scanning driving circuit 13. The first input terminal A1 and the second input terminal A2 of each pressure sensing unit 15 may be used to input bias signals. Scanning signals from one output terminal of the scanning driving circuit 13 may be outputted to the first input terminal A1 and the second input terminal A2 of one pressure sensing unit 15 as the bias signals. The first output terminal B1 of each pressure sensing unit 15 may output pressure sensing signals indicating the magnitude of external pressures. The magnitude of the external pressure (the pressure value when fingers press the display panel) may be determined based on the pressure sensing signals from the first output terminal B1 of each pressure sensing unit 15 and realize the pressure sensing. In one embodiment, the first output terminal B1 of each pressure sensing unit 15 may be connected to a processor on the display panel. The processor may receive the pressure sensing signals from the first output terminal B1 of each pressure sensing unit 15 and determine the magnitude of the external pressure based on the pressure sensing signals.

The display region 11 may include multiple rows of pixels, and each scanning line 14 may be connected to one row of pixels in the display region 11. The scanning lines 14 may be used to transfer scanning signals from the scanning driving circuit 13 to the pixels in the display region 11 and to turn on the pixels row by row. The pixels which are turned on may be lightened based on the display signals.

In the present disclosure, the scanning signals from the scanning driving circuit may include display signals used to scan and display pixels row by row, and may also include bias signals outputted to the pressure sensing units connected to the output terminals of the scanning driving circuit. Correspondingly, based on the bias signals on the first and second input terminals, the pressure sensing units output the pressure sensing signals to detect the magnitude of the pressure on the display panel. Thus, an extra driving circuit to provide the bias signals for the pressure sensing unit is unnecessary, reducing the cost of the display panel. Also, wires connecting the driving circuit to the pressure sensing unit can be reduced, and the wiring space can be saved. Thus, it is easier to realize the display panel with narrow sides because the wires connecting the driving circuit to the pressure sensing units are usually disposed in side regions of the display panel.

Figure 1B:
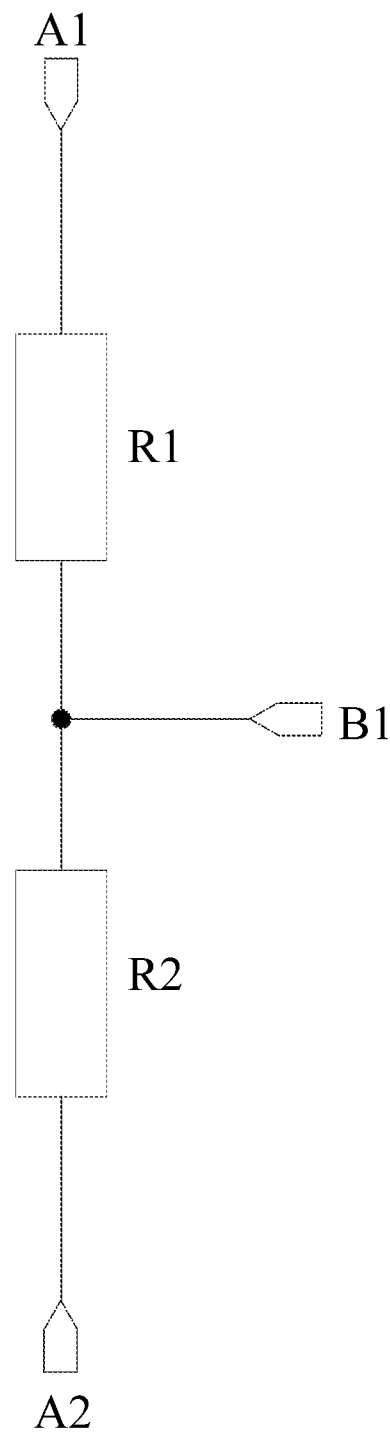
FIG. 1B illustrates an exemplary circuit of a pressure sensing unit consistent with disclosed embodiments.

FIG. 1B illustrates an exemplary circuit of the pressure sensing unit consistent with the disclosed embodiments. In one embodiment, the pressure sensing unit may include a first sensing resistor R1 and a second sensing resistor R2. The first terminal of the first sensing resistor R1 may be connected to the first input terminal A1 of the pressure sensing unit 15. The second terminal of the first sensing resistor R1 and the first terminal of the second sensing resistor R2 may be connected to the first output terminal B1 of the pressure sensing unit 15, and the second terminal of the second sensing resistor R2 may be connected to the second input terminal A2 of the pressure sensing unit 15.

Under a same external pressure force, the change rates of resistance of the first sensing resistor R1 and the second sensing resistor R2 may be different. For example, under the same external pressure force, the resistance of the first sensing resistor R1 may increase, while the resistance of the second sensing resistor R2 may decrease. Correspondingly, the signals from the first output terminal B1 of the pressure sensing unit 15 may change and the magnitude of the external pressure may be determined based on the pressure sensing signals from the first output terminal of the pressure sensing unit 15.

Figure 1C:
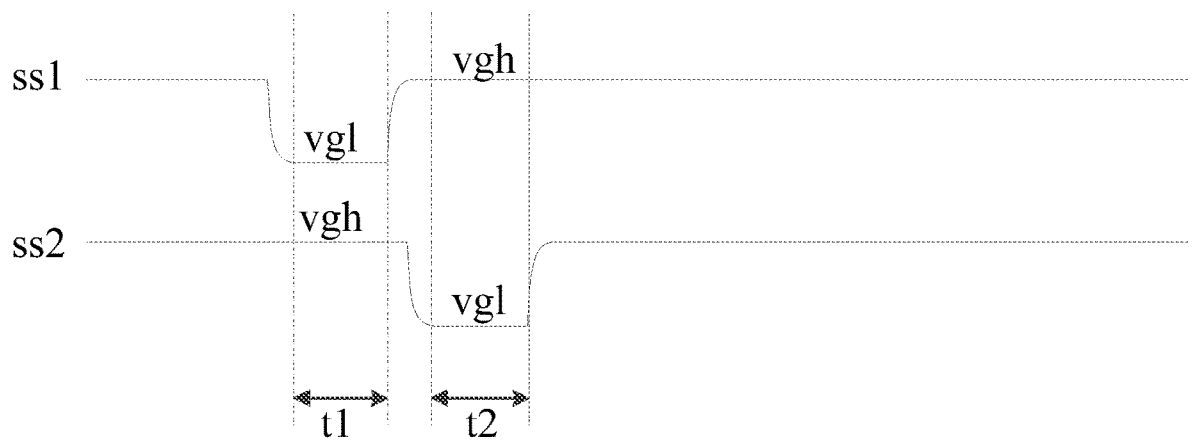
FIG. 1C illustrates an exemplary time sequence diagram of a scanning signal consistent with disclosed embodiments.

FIG. 1C illustrates an exemplary time sequential diagram of a scanning signal consistent with the disclosed embodiments. In one embodiment, SS1 may be a scanning signal from the first output terminal 'out1' of the scanning driving circuit 13, that is, the input signal to the first input terminal A1 of the pressure sensing unit 15. SS2 may be a scanning signal from the second output terminal 'out2' of the scanning driving circuit 13, that is, the input signal to the second input terminal A2 of the pressure sensing unit 15. SS1 and SS2 may include low-level stages and high-level stages. The voltage level of the low-level stages may be vgl, and the voltage level of the high-level stages may be vgh. If the voltage between the first input terminal A1 and the second input terminal A2 of the pressure sensing unit 15 is Uin, and the resistance of the first sensing resistor R1 and the second sensing resistor R2 is r1 and r2 respectively, the output voltage Uout of the first output terminal B1 may be $$Uout = Uin \times \frac{r1}{r1 + r2}.$$

As illustrated in FIG. 1B and FIG. 1C, without the external pressure, the resistance of the first sensing resistor R1 and the second sensing resistor R2 may be unchanged. In the t1 stage (the first-row scanning stage), the first input terminal A1 of the pressure sensing unit 15 may receive a low-level signal (voltage is vgl), and the second input terminal A2 may receive a high-level signal (voltage is vgh). The output voltage U1 of the first output terminal B1 of the pressure sensing unit 15 may be $$U1 = (vgl - vgh) \times \frac{r1}{r1 + r2}.$$

In the t2 stage (the second-row scanning stage), the first input terminal A1 of the pressure sensing unit 15 may receive a high-level signal (voltage is vgh), and the second input terminal A2 may receive a low-level signal (voltage is vgl). The output voltage U2 of the first output terminal B1 of the pressure sensing unit 15 may be $$U2 = (vgl - vgh) \times \frac{r2}{r1 + r2}.$$

If r1=r2=r, then U1−U2=0, that is, the difference between the output voltages on the output terminal B1 of the pressure sensing unit 15 during these two scanning stages is zero.

If the change of the resistance may be Δr after applying the pressure, the value of the first sensing resistor R1 may increase by Δr and the value of the second sensing resistor R2 may decrease by Δr. As illustrated in FIG. 1B and FIG. 1C, the output voltage U1 of the first output terminal B1 of the pressure sensing unit 15 may be $$U1 = (vgl - vgh) \times \frac{r1 + \Delta r}{r1 + r2}$$

in the t1 stage, and the output voltage U2 of the first output terminal B1 of the pressure sensing unit 15 may be $$U2 = (vgl - vgh) \times \frac{r2 - \Delta r}{r1 + r2}$$

in the t2 stage. The difference between the output voltages from the output terminal B1 of the pressure sensing unit 15 between these two scanning stages may be $$U1 - U2 =$$
$$(vgl - vgh) \times \frac{r1 - r2 + 2\Delta r}{r1 + r2} = (vgl - vgh) \times \frac{2\Delta r}{2r} = (vgl - vgh) \times \frac{\Delta r}{r}.$$

Correspondingly, the magnitude of the external pressure may be determined by this voltage difference.

In the present disclosure, the pressure sensing unit 15 in the display panel can determine the magnitude of the pressure based on the scanning signals, so an extra driving circuit to provide the bias signals for the pressure sensing units can be omitted, which can reduce the circuit area and cost. Moreover, the driving circuit usually is disposed in bottom side regions of the display panel, and the wires of the driving circuit and the pressure sensing units usually extend from the bottom side areas to left/right side areas. Thus, the wires connecting the driving circuit to the pressure sensing units are also reduced, which reduces the wiring space and makes it easier to realize the display panel with narrow sides.

Figure 2A:
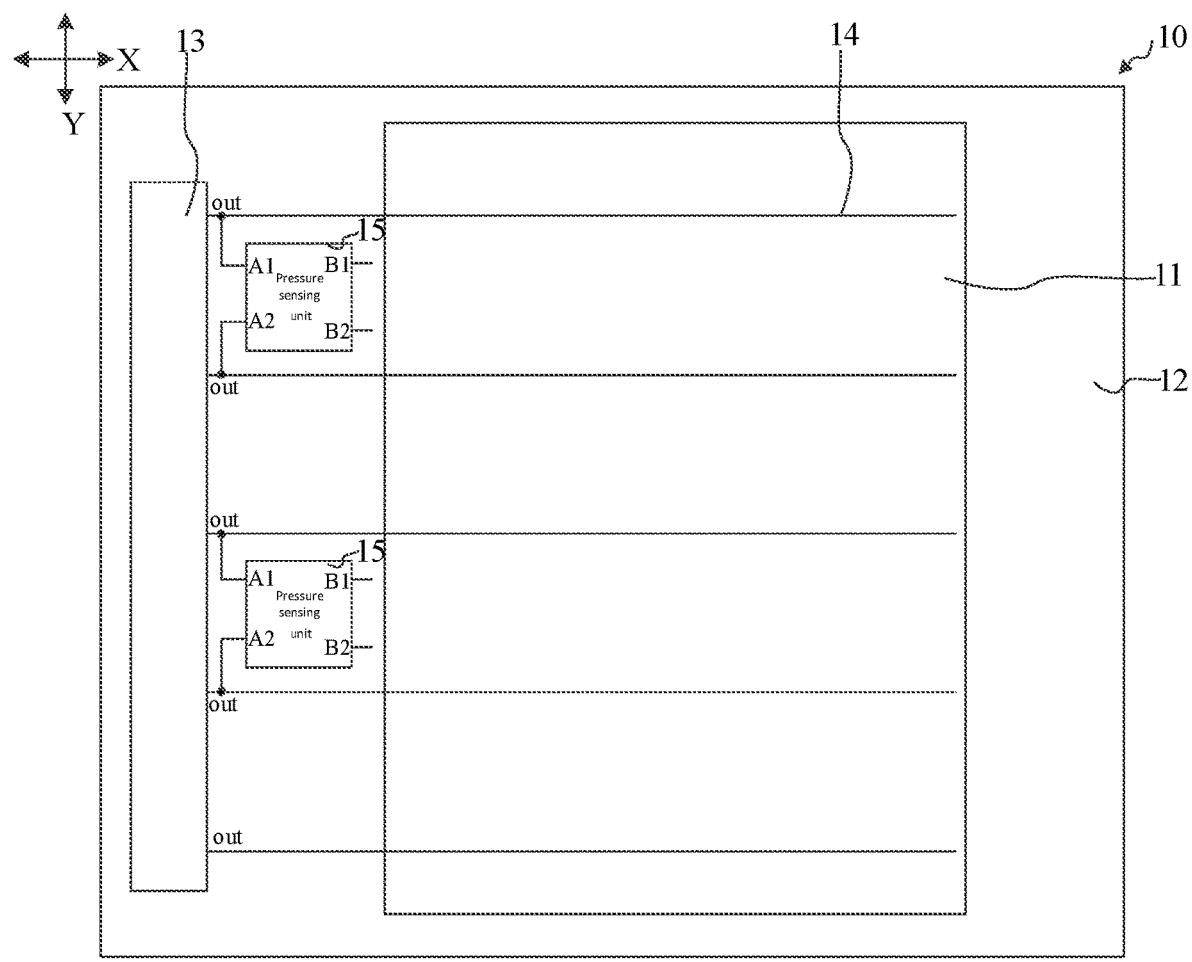
FIG. 2A illustrates another exemplary structure of the display panel consistent with disclosed embodiments.

FIG. 2A illustrates another exemplary structure of the display panel consistent with the disclosed embodiments. Each pressure sensing unit in this display panel may include two output terminals: a first output terminal B1 and a second output terminal B2. The first output terminal B1 and second output terminal B2 may work together to output pressure sensing signals. As illustrated in FIG. 2A, the display panel 10 may include: a display region 11, a non-display region 12, a scanning driving circuit 13 in the non-display region 12, a plurality of scanning line 14 extending in a first direction X and arranged in a second direction Y, and at least one pressure sensing unit 15.

Each scanning line 14 may be connected to one of the output terminals of the scanning driving circuit 13. The scanning driving circuit 13 may include multiple output terminals and each output terminal may be connected to one scanning line 14. The first direction X may be perpendicular to the second direction Y. Each pressure sensing unit 15 may include a first input terminal A1, a second input terminal A2, a first output terminal B1 and a second output terminal B2. The first input terminal A1 and the second input terminal A2 may be connected to the different scanning signal output terminal of the scanning driving circuit 13 and may be used for inputting the bias signals. The scanning signals from the output terminals of the scanning driving circuit 13 may be provided to the first input terminal A1 and the second input terminal A2 of each pressure sensing unit 15 as the bias signals. The first output terminal B1 and the second output terminal B2 of each pressure sensing unit 15 may work together to output the pressure sensing signals.

Figure 2B:
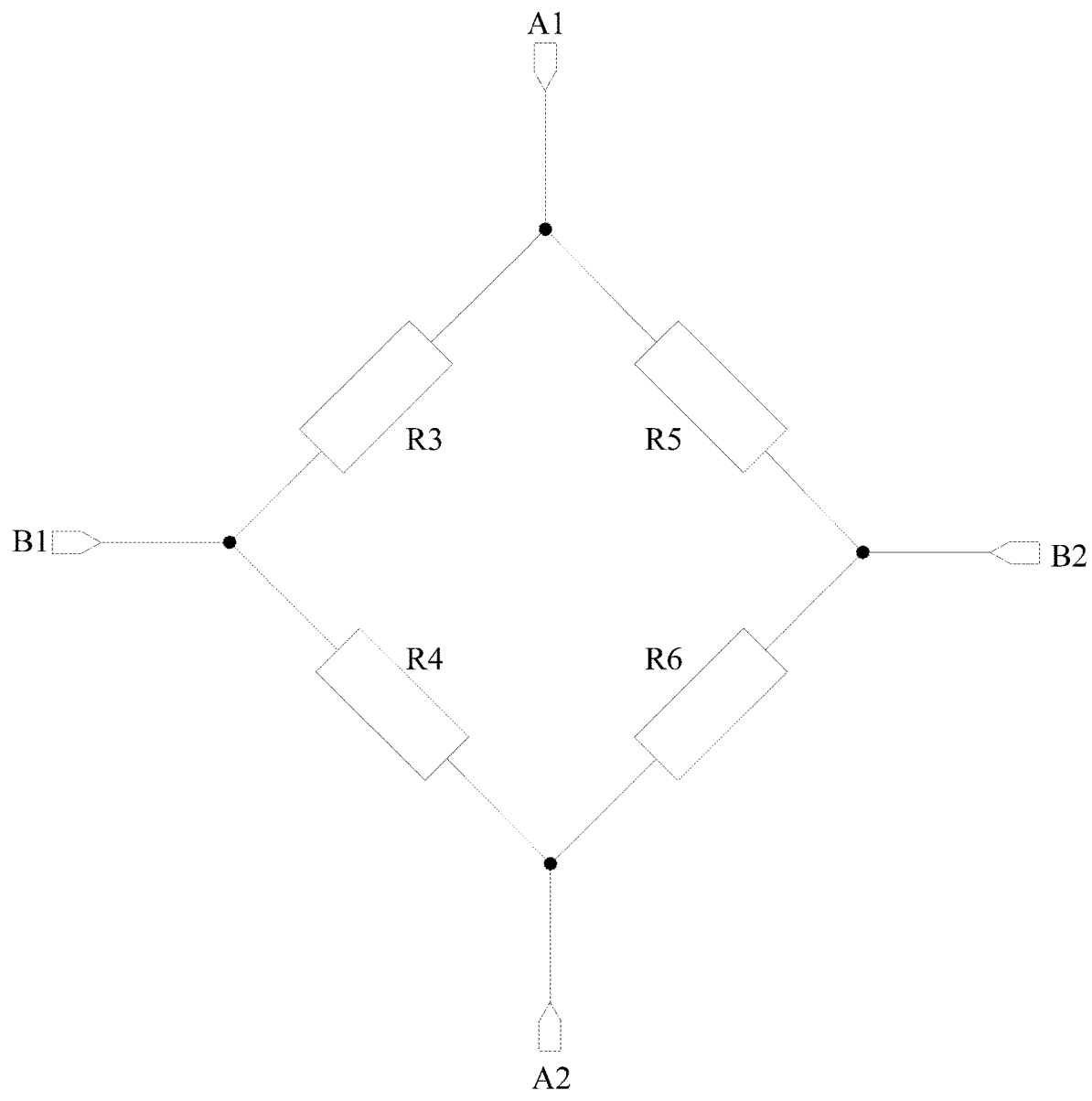
FIG. 2B illustrates another exemplary circuit of the pressure sensing unit consistent with disclosed embodiments.

FIG. 2B illustrates another exemplary circuit of the pressure sensing unit consistent with the disclosed embodiments. In one embodiment, the pressure sensing unit 15 may include a third sensing resistor R3, a fourth sensing resistor R4, a fifth sensing resistor R5 and a sixth sensing resistor R6. The first terminal of the third sensing resistor R3 and the first terminal of the fifth sensing resistor R5 may be connected to the first input terminal A1 of the pressure sensing unit 15. The second terminal of the third sensing resistor R3 and the first terminal of the fourth sensing resistor R4 may be connected to the first output terminal B1 of the pressure sensing unit 15. The second terminal of the fifth sensing resistor R5 and the first terminal of the sixth sensing resistor R6 may be connected to the second output terminal B2 of the pressure sensing unit, while the second terminal of the fourth sensing resistor R4 and the second terminal of the sixth sensing resistor R6 may be connected to the second input terminal A2 of the pressure sensing unit 15.

The resistance of the third sensing resistor R3 and the sixth sensing resistor R6 may change by a same magnitude and direction, while the resistance of the fourth sensing resistor R4 and the fifth sensing resistor R5 may change by a same magnitude and direction, under a same external pressure force. However, the magnitude and the direction of the change in the resistance of the third sensing resistor R3 may be different from the fourth sensing resistor R4. Correspondingly, the first output terminal B1 and the second output terminal B2 of each pressure sensing unit 15 may output different electrical signals under the external pressure, and the magnitude of the external pressure may be determined based on the electrical signals from the first output terminal B1 and the second output terminal B2 of each pressure sensing unit 15. In one embodiment, the difference between the electrical signals from the first output terminal B1 and the second output terminal B2 of each pressure sensing unit 15 may be used to determine the magnitude of the external pressure.

As illustrated in FIG. 1C and FIG. 2B, the resistance of the third sensing resistor R3, the fourth sensing resistor R4, the fifth sensing resistor R5 and the sixth sensing resistor R6 may not change without the external pressure. In t1 stage, the first input terminal A1 of the pressure sensing unit 15 may receive a low-level signal (voltage value is vgl), and the second input terminal A2 may receive a high-level signal (voltage value is vgh). Then, in the first-row scanning stage, the output voltage U3 of the first output terminal B1 of the pressure sensing unit 15 may be $$U3 = (vgl - vgh) \times \frac{r3}{r3 + r4},$$

and the output voltage of the second output terminal B2 may be $$U4 = (vgl - vgh) \times \frac{r5}{r5 + r6}.$$

If $r3=r4=r5=r6=r$, then $$U3 - U4 = (vgl - vgh) \times \frac{r3}{r3 + r4} - (vgl - vgh) \times \frac{r5}{r5 + r6} = 0,$$

that is, the voltage difference between the output signals from the first output terminal B1 and the second output terminal B2 of the pressure sensing unit 15 may be zero. In the t2 stage, the voltage difference between the output signals from the first output terminal B1 and the second output terminal B2 of the pressure sensing unit 15 may be zero too.

After applying the external pressure, the resistance of the third sensing resistor R3 and the sixth sensing resistor R6 may increase by $\Delta r$, while the resistance of the fourth sensing resistor R4 and the fifth sensing resistor R5 may decrease by $\Delta r$. Thus in the t1 stage, the output voltage of the first output terminal B1 of the pressure sensing unit 15 may be $$U3 = (vgl - vgh) \times \frac{r3 + \Delta r}{(r3 + \Delta r) + (r4 - \Delta r)} = (vgl - vgh) \times \frac{r3 + \Delta r}{r3 + r4},$$

and the output voltage of the second output terminal B2 may be $$U4 = (vgl - vgh) \times \frac{r5 - \Delta r}{(r5 - \Delta r) + (r6 + \Delta r)} = (vgl - vgh) \times \frac{r5 - \Delta r}{r5 + r6}.$$

Correspondingly, the voltage difference between the output signals from the first output terminal B1 and the second output terminal B2 of the pressure sensing unit 15 may be $$U3 - U4 = (vgl - vgh) \times \left( \frac{r3 + \Delta r}{r3 + r4} - \frac{r5 - \Delta r}{r5 + r6} \right) = (vgl - vgh) \times \frac{\Delta r}{r}.$$

Then, the magnitude of the external pressure could be determined based on the voltage difference between the output signals from the first output terminal B1 and the second output terminal B2 of the pressure sensing unit 15.

The magnitude of the external pressure may be also determined based on the scanning signals in the t2 stage. As illustrated in FIG. 1C and FIG. 2B, in the t2 stage, the first input terminal A1 of the pressure sensing unit 15 may receive the high voltage level signal (the voltage is vgh), while the second input terminal A2 may receive the low voltage level signal (the voltage is vgl).

Correspondingly, in the second-row scanning stage (the t2 stage), the output voltage of the first output terminal B1 of the pressure sensing unit 15 may be $$U5 = (vgh - vgl) \times \frac{r3 + \Delta r}{(r3 + \Delta r) + (r4 - \Delta r)} = (vgh - vgl) \times \frac{r3 + \Delta r}{r3 + r4},$$

and the output voltage of the second output terminal B2 may be $$U6 = (vgh - vgl) \times \frac{r5 - \Delta r}{(r5 - \Delta r) + (r6 + \Delta r)} = (vgh - vgl) \times \frac{r5 - \Delta r}{r5 + r6}.$$

Correspondingly, the voltage difference between the output signals from the first output terminal B1 and the second output terminal B2 of the pressure sensing unit 15 may be $$5 - U6 = (vgh - vgl) \times \left( \frac{r3 + \Delta r}{r3 + r4} - \frac{r5 - \Delta r}{r5 + r6} \right) = (vgh - vgl) \times \frac{\Delta r}{r},$$

and the magnitude of the external pressure may be determined based on the voltage difference between the output signals from the first output terminal B1 and the second output terminal B2.

In another embodiment of the present disclosure, the magnitude of the pressure may be also determined by the difference between the output voltage difference from the first output terminal B1 and the second output terminal B2 in these two scanning stages, such as $$C_{t1} - C_{t2} = (U3 - U4) - (U5 - U6) =$$
$$2(vgl - vgh) \times \left( \frac{r3 + \Delta r}{r3 + r4} - \frac{r5 - \Delta r}{r5 + r6} \right) = 2(vgl - vgh) \times \frac{\Delta r}{r}.$$

In this approach, the difference between the output voltage difference from the first output terminal B1 and the second output terminal B2 in these two scanning stages may be larger than the voltage difference of the output signals from the first output terminal B1 and the second output terminal B2 in each scanning stages in the case of the same pressure, and subsequently the pressure sensing unit 15 may have a higher sensitivity. Thus the measurement accuracy may be improved and the measurement error may be reduced.

Figure 2C:
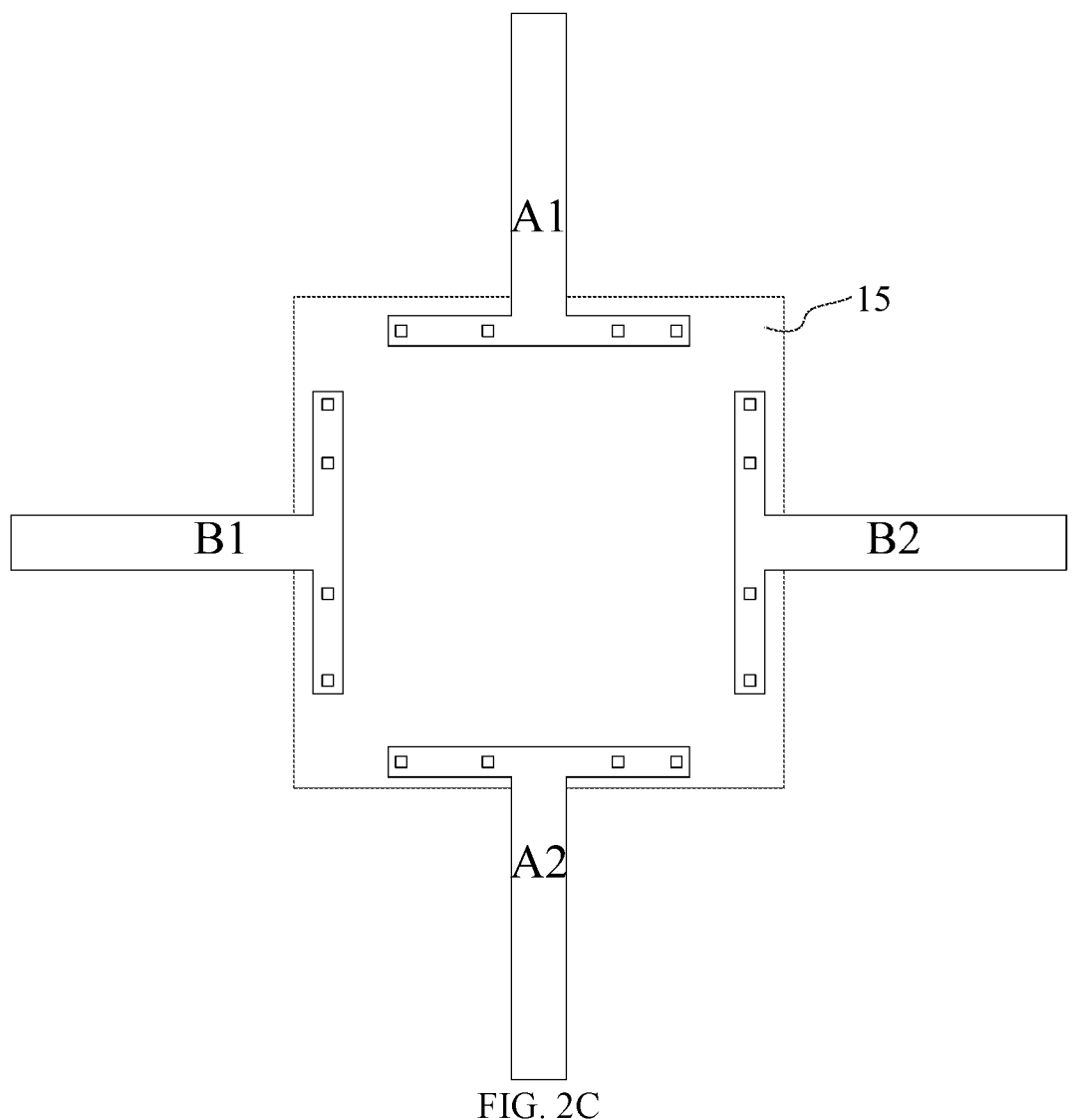
FIG. 2C illustrates an exemplary structure of the pressure sensing unit consistent with disclosed embodiments.
Figure 2D:
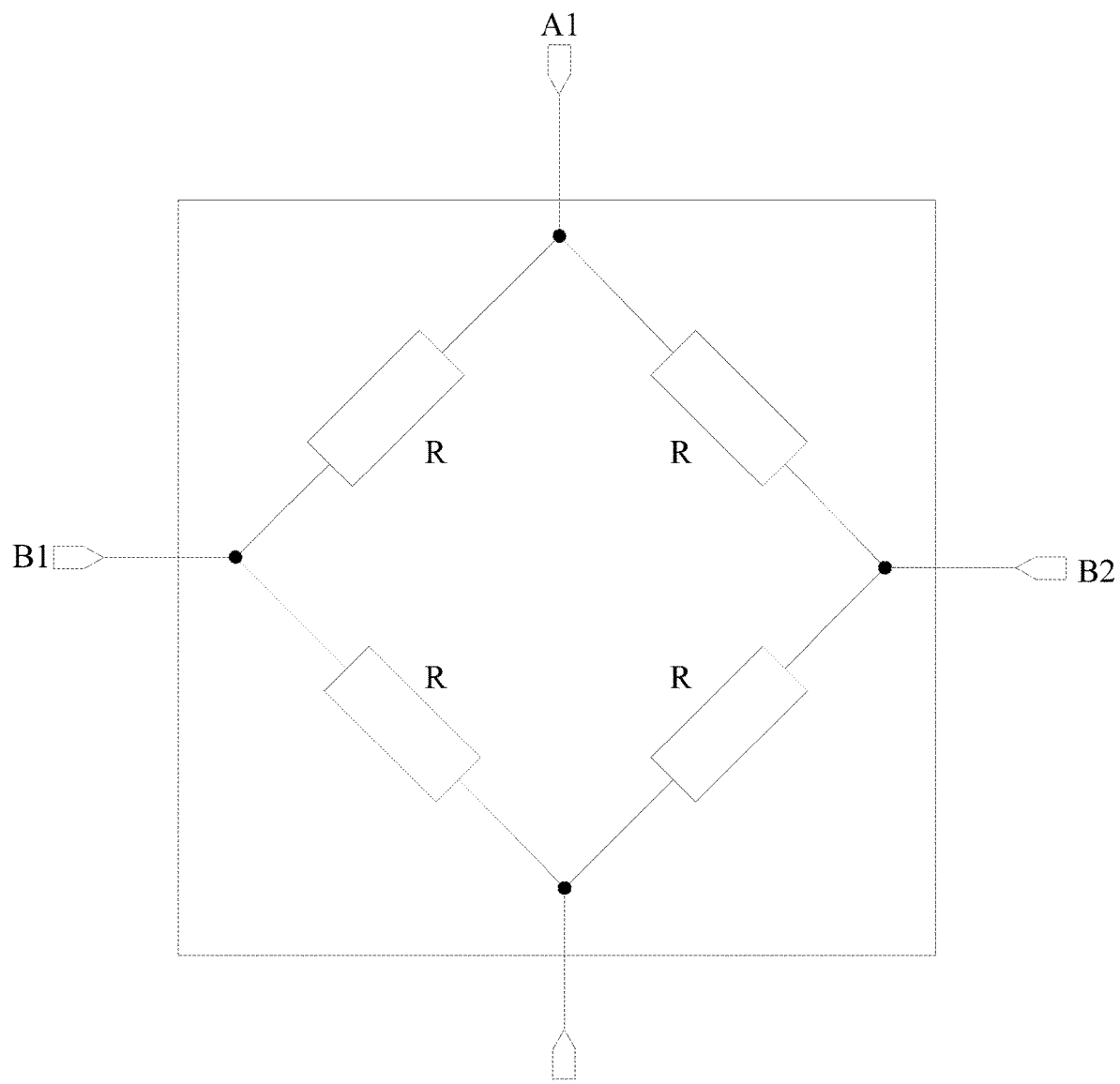
FIG. 2D illustrates another exemplary circuit of the pressure sensing unit consistent with disclosed embodiments.

FIG. 2C illustrates an exemplary structure of the pressure sensing unit consistent with the disclosed embodiments. The pressure sensing unit may be rectangular and made of a semiconductor material. The pressure sensing unit may include a first side a second side, a third side and a fourth side, where the first side and the second side may be disposed oppositely, and the third and fourth side may be disposed oppositely. The first input terminal A1, the second input terminal A2, the first output terminal B1 and the second output terminal B2 may be disposed in the first side, the second side, the third side, and the fourth side respectively. The effective circuit of the pressure sensing unit is illustrated in FIG. 2D. The two adjacent terminals (the first input terminal A1 and the first output terminal B1, the first input terminal A1 and the second output terminal B2, the second input terminal A2 and the first output terminal B1, the second input terminal A2 and the second output terminal B2) may be connected by a semiconductor thin film, which is equivalent to a connection through an effective resistor. Subsequently, the effective resistance bridge illustrated in FIG. 2B may be derived through the four effective resistors between the four terminals. The principle of determining the pressure can be referred to the description of the working process of the pressure sensing unit in FIG. 2B.

In other embodiments, the pressure sensing unit may be a square.

Figure 3A:
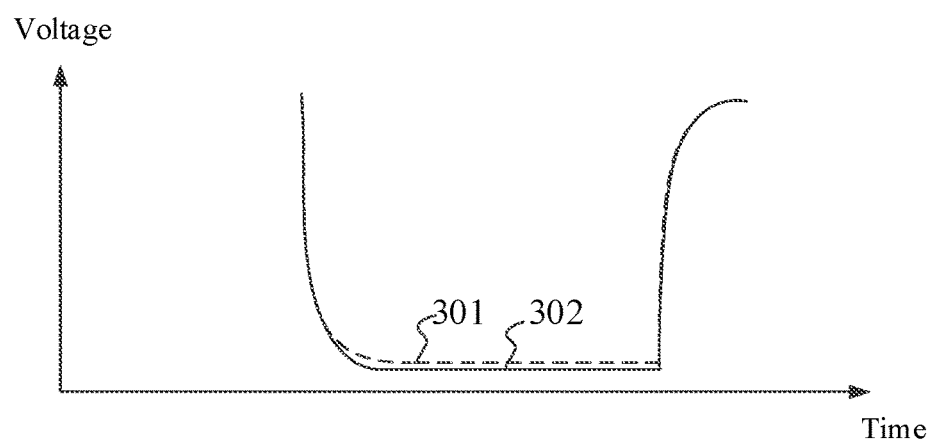
FIG. 3A illustrates the comparison between the output waveforms from the scanning driving circuit consistent with disclosed embodiments.

In the disclosed embodiments, each scanning line 14 is electrically connected to one output terminal of the scanning driving circuit 13 which is connected to the first input terminal A1 or the second input terminal A2 of the pressure sensing unit 15. Thus, the deviation of the voltage pulse in the scanning line 14 may be too large when the resistance of the pressure sensing unit 15 is small. As illustrated in FIG. 3A, 301 is the output scanning signal from the output terminal of the scanning driving circuit 13 which is connected to the pressure sensing unit 15, when the resistance between the first input terminal A1 and the second input terminal A2 of the pressure sensing unit 15 is 0.1 MΩ. 302 is the output scanning signal from the output terminal of the scanning driving circuit 13 which is not connected to the pressure sensing unit 15. The regular pulse voltage is the pulse voltage in the scanning line 14 connected to the scanning driving circuit 13 when the scanning driving circuit 13 is not connected to the pressure sensing unit 15. Referring to FIG. 3A, there is some deviation between 301 and 302, which subsequently may induce that the pulse voltage in the scanning line is lower by 0.5 V than the regular pulse voltage. This voltage difference may induce the difference between the luminance of the pixels connected to this scanning line 14 and the pixels connected to other scanning lines 14, and then the abnormal luminance of the pixels in the row connected to this scanning line 14, because of the parasitic capacitance effect in the row of the pixels connected to this scanning line 14.

Figure 3B:
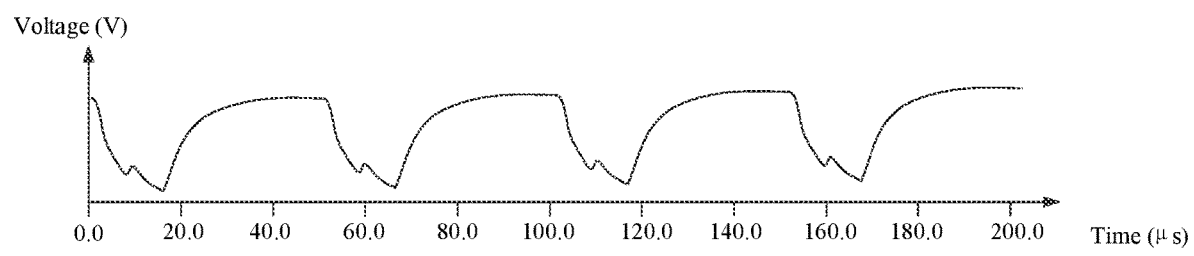
FIG. 3B illustrates an exemplary waveform of the output voltage from the pressure sensing unit consistent with disclosed embodiments.

The case when the resistance of the pressure sensing unit 15 is too large is shown in FIG. 3B. FIG. 3B illustrates a waveform of the output voltage from the first output terminal B1 when the resistance between the first input terminal A1 and the second input terminal A2 of the pressure sensing unit is 10 MΩ. In this case, the RC load of the pressure sensing unit 15 may be too large, and then the delay of the output signal from the first output terminal B1 of the pressure sensing unit 15 may be too large for the signal to be measured. Subsequently, the magnitude of the pressure may be not determined effectively. In one embodiment of the present disclosure, the resistance between the first input terminal A1 and the second input terminal A2 of the pressure sensing unit may be 0.1~10 MΩ. In this range of the resistance, the pressure sensing unit 15 may effectively determine the magnitude of the pressure based on the scanning signals from the scanning driving circuit 13, while this value may not induce a large influence on the pulse signals in the scanning line 14 and interfere the normal display.

An optimized value of the resistance between the first input terminal A1 and the second input terminal A2 of the pressure sensing unit may be 1 MΩ, such that relatively small influence may be on the scanning signals on the scanning line 14 and normal display may be achieved. Also, the delay of the output signals from the pressure sensing unit 15 may be relatively small, ensuring the effective detection of the magnitude of the pressure.

In one embodiment of the present disclosure, the first input terminal A1 and the second input terminal A2 of the pressure sensing unit 15 may be connected to different scanning signal output terminals of the scanning driving circuit 13, respectively, and these two scanning signal output terminals of the scanning driving circuit 13 may be adjacent or may not be adjacent. When the two scanning signal output terminals connected to the first input terminal A1 and the second input terminal A2 of the pressure sensing unit 15 are not adjacent, there are other scanning signal output terminals between these two scanning signal output terminals, and the two scanning lines connected to these two scanning signal output terminals are not adjacent, too.

The pulses of the scanning signals outputted from different scanning signal output terminals may have a certain amount of temporal delay. Subsequently, when using these two rows of the scanning signals as the bias signal to detect the pressure, if the large time interval between two rows of the scanning signals is relatively large (for example, when the press is completed, another scanning signal output terminal does not output the scanning signal), the detection of the magnitude of the pressure may be skipped or may be inaccurate. In one embodiment of the present disclosure, there may be any number of scanning signal output terminals between the first input terminal A1 and the second input terminal A2 of the pressure sensing unit 15, as long as the magnitude of the pressure can be determined accurately.

In other embodiments, the first input terminal A1 and the second input terminal A2 of the pressure sensing unit 15 may be connected to two adjacent scanning signal output terminals of the scanning driving circuit 13. Correspondingly, the interval time between the scanning signals inputted to the first terminal A1 and the second terminal A2 is small, which may ensure the effective determination of the magnitude of the pressure and improve the accuracy of the detection.

In one embodiment of the present disclosure, the scanning signals in the scanning lines 14 and the normal display may be interfered when one scanning signal output terminal of the scanning driving circuit 13 is connected to multiple pressure sensing units 15. To reduce the influence of the pressure sensing unit 15 on the scanning signals in the scanning lines 14, each scanning signal output terminal may be connected to only one pressure sensing unit 15, i.e., each scanning signal output terminal may be connected to only the first input terminal A1 or the second input terminal A2 of one pressure sensing unit. Subsequently, the stability of the display performance and pressure sensing may be improved.

Figure 4:
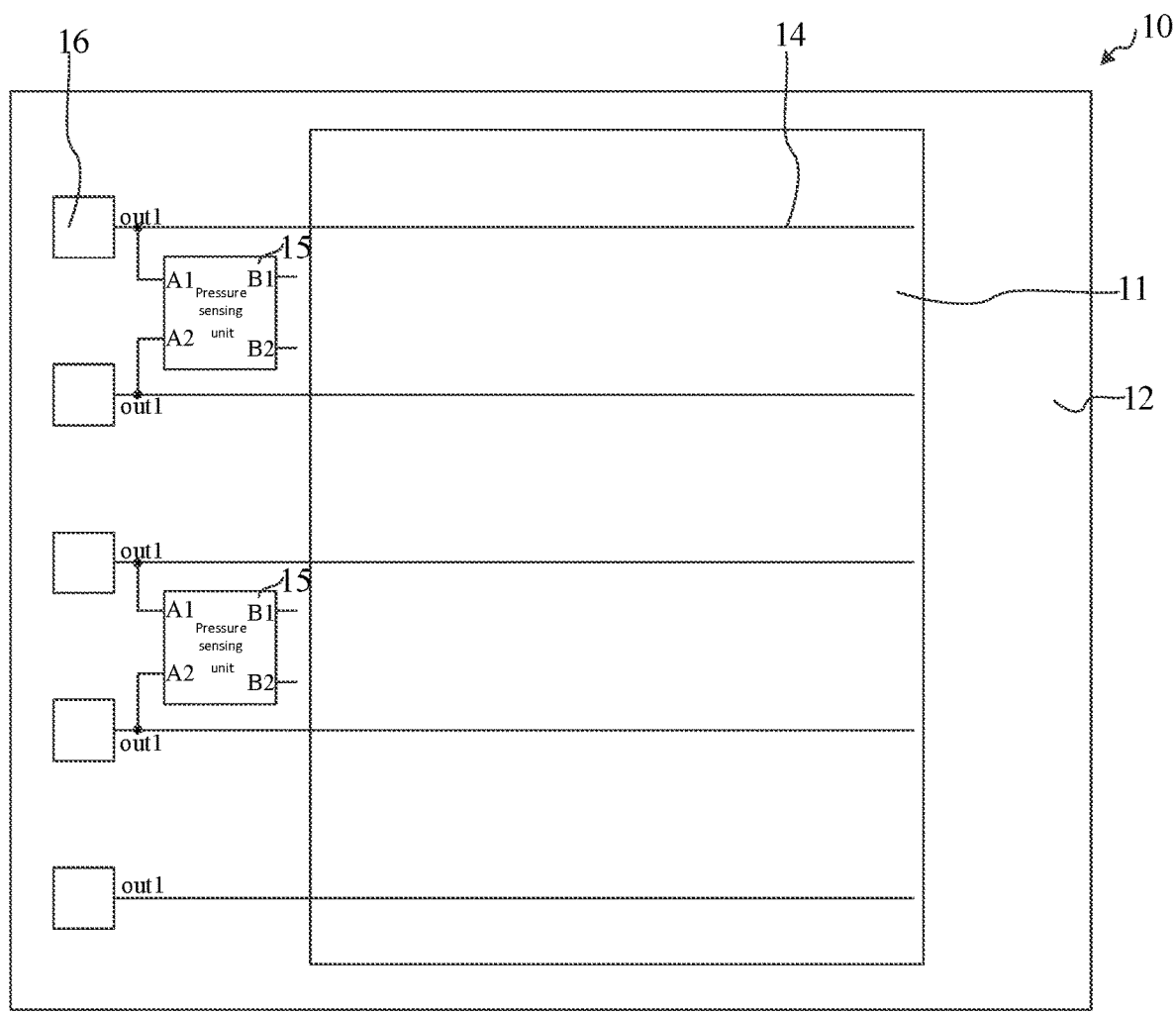
FIG. 4 illustrates another exemplary structure of the display panel consistent with disclosed embodiments.

FIG. 4 illustrates another exemplary structure of the display panel consistent with the disclosed embodiments. As illustrated in FIG. 4, the scanning driving circuit 13 may include a plurality of shift register units 16. Further, the first input terminal A1 and the second input terminal A2 of each pressure sensing unit 15 may be connected to the output terminals of different shift register units 16. The output terminal of each shift register unit 16 may connect to one scanning line 14. Each pressure sensing unit 15 may be disposed in the non-display region 12 between shift register units 16 each having a different level (such as between adjacent shift register units 16).

The shift register units 16 may output the scanning signals to the scanning lines 14 level by level, to drive the display row by row. Since each pressure sensing unit 15 may be disposed in the non-display region 12 between different shift register units 16, the pressure sensing units 15 may not occupy additional side region of the display panel and it may be easy to realize the display panel with narrow sides.

In one embodiment of the present disclosure, three or four pressure sensing units 15 may be disposed in one side of the non-display region 12 of the display panel, and each pressure sensing unit 15 may be used to detect the pressure in a certain area. Usually, three or four pressure sensing units 15 in one side of the non-display region 12 of the display panel may be enough to detect the pressure in the whole display panel. In one embodiment, left and right side of the non-display region 12, i.e., left and right side of the display panel may be each provided with three or four pressure sensing units 15. In other embodiments, a different number of the pressure sensing units 15 may be provided according to the different size of the display panels and the necessary accuracy of the pressure detecting.

Figure 5:
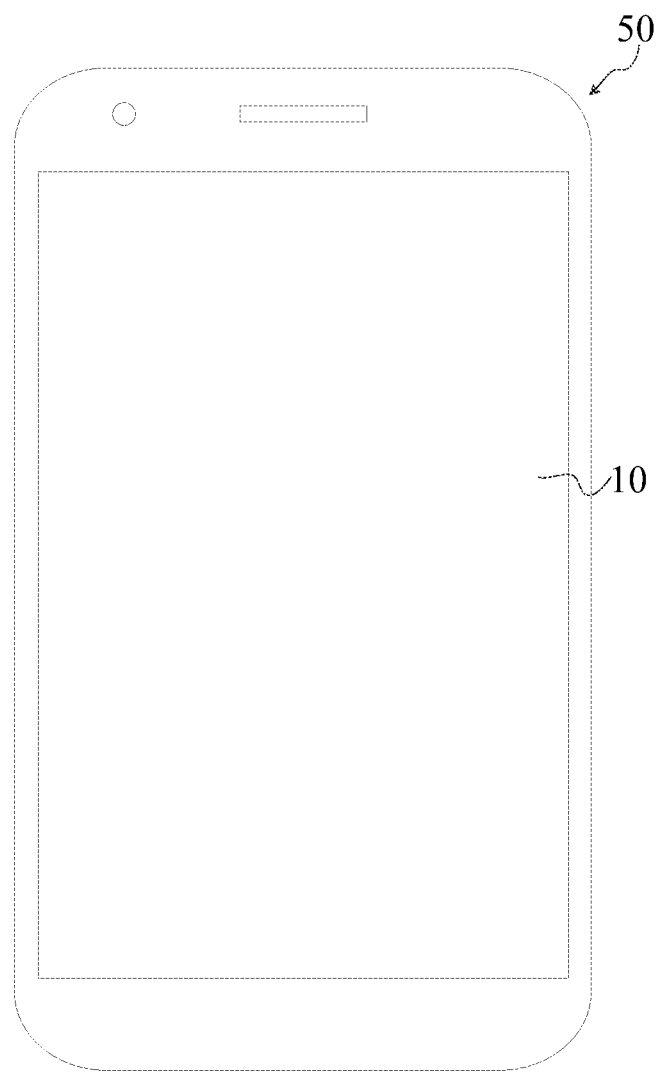
FIG. 5 illustrates an exemplary structure of a display device consistent with disclosed embodiments.

The embodiments of the present disclosure provide a display device as shown in FIG. 5. The display device may include a display panel 10 provided by any embodiment of the present disclosure.

The embodiment of the present disclosure provides a method to detect the pressure, which may be used to detect the touch pressure on the display panel provided by any embodiment of the present disclosure. The display panel may include a display region, a non-display region, a scanning driving circuit in the non-display region, a plurality of scanning lines, and at least one pressure sensing unit.

Each pressure sensing unit may include a first input terminal, a second input terminal, a first output terminal, and the first input terminal. The second input terminal may be connected to one of the different scanning signal output terminals of the scanning driving circuit, respectively. The first output terminal may be used for outputting the pressure sensing signals.

Figure 6:
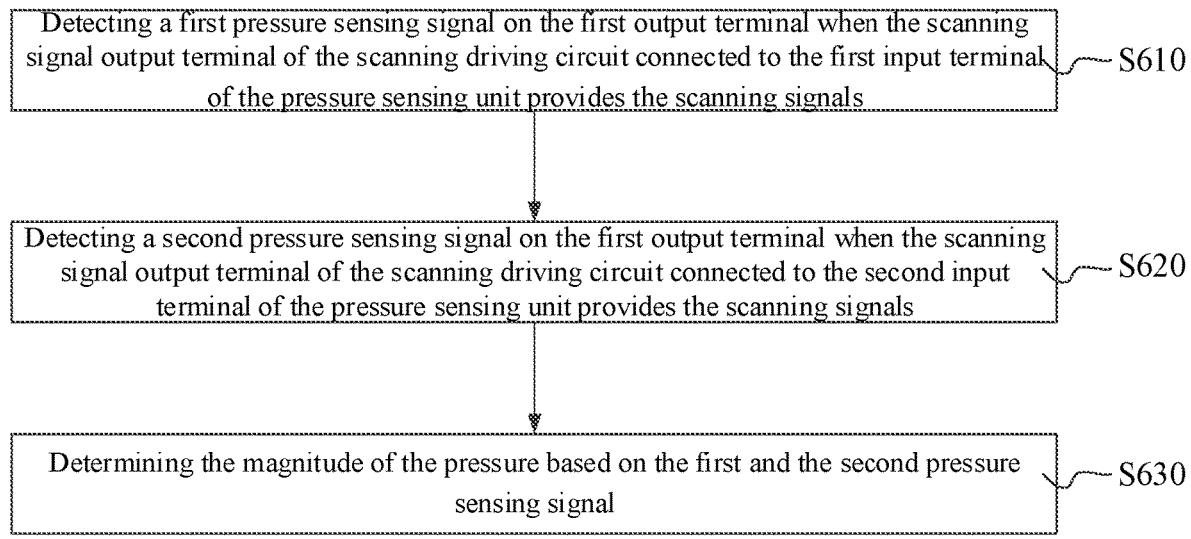
FIG. 6 illustrates a flow chart of an exemplary method to detect the pressure on the display panel consistent with disclosed embodiments.

FIG. 6 illustrates a flow chart of a method to detect the pressure consistent with the disclosed embodiments. As shown in FIG. 6, when the output terminal of the scanning driving circuit connected to the first input terminal of each pressure sensing unit provides the scanning signal, a first pressure sensing signal on the first output terminal is detected (S610).

Further, when the output terminal of the scanning driving circuit connected to the second input terminal of each pressure sensing unit provides the scanning signal, a second pressure sensing signal on the first output terminal is detected (S620).

Further, based on the first pressure sensing signal and the second pressure sensing signal, the magnitude of the pressure are determined (S630).

For example, the magnitude of the pressure may be determined from the difference between the first and the second pressure sensing signals. Without the pressure applied on the display panel, the difference between the first and the second pressure sensing signals may be a default value such as zero. The difference between the first and the second pressure sensing signals may change to a value corresponding to the pressure, and the magnitude of the pressure may be determined based on the difference between the first and the second pressure sensing signals.

In other embodiments of the present disclosure, each pressure sensing unit may further include a second output terminal. Another method to detect the magnitude of the pressure is provided by the embodiments. When the output terminal of the scanning driving circuit connected to the first input terminal of each pressure sensing unit provides the scanning signal, a first difference between the signal from the first output terminal and the signal from the second output terminal is detected.

Further, when the output terminal of the scanning driving circuit connected to the second input terminal of each pressure sensing unit provides the scanning signal, a second difference between the signal from the first output terminal and the signal from the second output terminal is detected. Thus, based on the first difference and the second difference, the magnitude of the pressure are determined.

In the present disclosure, the scanning signals from the scanning driving circuit not only are used to scan/display row by row but also are provided to each pressure sensing unit which is connected to the output terminal of the scanning driving circuit. Correspondingly, each pressure sensing unit outputs the pressure sensing signals to monitor the magnitude of the pressure on the display panel based on the bias signals on the first and second input terminal. Thus, the individual driving circuit to provide the bias signal for each pressure sensing unit may be omitted, reducing the cost. Also, the connection wires from the driving circuit to each pressure sensing unit may be reduced, saving the wiring space. Correspondingly, it is easier to realize a narrower side in the display panel because the connection wires from the driving circuit to each pressure sensing unit can reside in the side region of the display panel.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A display panel, comprising:
    a display region;
    a non-display region;
    a scanning driving circuit, disposed in the non-display region and having a plurality of output terminals; and
    a pressure sensing unit connected to the scanning driving circuit and including a first input terminal, a second input terminal, a first output terminal, and a second output terminal, and wherein:
      the first input terminal and the second input terminal of the pressure sensing unit are connected to a first output terminal and a second output terminal of the plurality of output terminals of the scanning driving circuit, respectively,
      while being connected to the pressure sensing unit, each of the first and second output terminals of the scanning driving circuit is further connected to a different row of pixels of a plurality of rows of pixels via a scanning line to transmit a display signal from the scanning driving circuit to turn on the row of pixels in the display region, and
    the first input terminal is connected to the first output terminal of the scanning driving circuit to receive the display signal thereon, and a first difference between signals from the first output terminal and the second output terminal of the pressure sensing unit is detected;

the second input terminal is connected to the second output terminal of the scanning driving circuit to receive the display signal thereon, and a second difference between signals from the first output terminal and the second output terminal of the pressure sensing unit is detected; and a magnitude of a pressure on the display panel is determined based on the first difference and the second difference, wherein:
  the scanning driving circuit includes a plurality of shift register units;
  the first input terminal and the second input terminal of the pressure sensing unit are connected to a scanning signal output terminal of different shift register units of the plurality of shift register units; and
  the pressure sensing unit is disposed between different shift register units in the non-display region.

2. The display panel according to claim 1, wherein:
  the pressure sensing unit includes a first sensing resistor and a second sensing resistor;
  a first terminal of the first sensing resistor is connected to the first input terminal of the pressure sensing unit;
  a second terminal of the first sensing resistor and a first terminal of the second sensing resistor are connected to the first output terminal of the pressure sensing unit; and
  a second terminal of the second sensing resistor is connected to the second input terminal of the pressure sensing unit.

3. The display panel according to claim 1, wherein:
  the pressure sensing unit includes a third sensing resistor, a fourth sensing resistor, a fifth sensing resistor, and a sixth sensing resistor;
  a first terminal of the third sensing resistor and the fifth sensing resistor are connected to the first input terminal of the pressure sensing unit, while a second terminal of the third sensing resistor and a first terminal of the fourth sensing resistor are connected to the first output terminal of the pressure sensing unit; and
  a second terminal of the fifth sensing resistor and a first terminal of the sixth sensing resistor are connected to a second output terminal of the pressure sensing unit, while a second terminal of the fourth sensing resistor and a second terminal of the sixth sensing resistor are connected to the second input terminal of the pressure sensing unit.

4. The display panel according to claim 1, wherein the pressure sensing unit is rectangularly shaped and made of semiconductor materials.

5. The display panel according to claim 4, wherein the pressure sensing unit includes a first side, a second side, a third side and a fourth side, wherein the first side and the second side are disposed oppositely, and the third and fourth side is disposed oppositely; and
  the first input terminal, the second input terminal, the first output terminal, and the second output terminal of the pressure sensing unit are disposed in the first side, the second side, the third side, and the fourth side respectively.

6. The display panel according to claim 1, wherein the pressure sensing unit is square-shaped.

7. The display panel according to claim 1, wherein a resistance between the first and the second input terminals is 0.1 MΩ to 10 MΩ.

8. The display panel according to claim 7, wherein the resistance between the first and the second input terminals is 1 MΩ.

9. The display panel according to claim 1, wherein the first input terminal and the second input terminal of the pressure sensing unit are connected to two adjacent output terminals of the scanning driving circuit.

10. A display device, including the display panel according to claim 1.

11. The display panel according to claim 1, further including:
  a plurality of scanning lines, extending in a first direction and being arranged in a second direction perpendicular to the first direction, wherein:
    each of the scanning lines is connected to one of the plurality of output terminals of the scanning driving circuit.

12. The display panel according to claim 1, wherein:
  each of the scanning lines is connected to one row of pixels of the plurality of rows of pixels in the display region to transfer display signals from the scanning driving circuit to scan and lighten the plurality of rows of pixels row by row.

13. A pressure sensing method for detecting touch pressure on a display panel having a display region, a non-display region, a scanning driving circuit disposed in the non-display region and having a plurality of output terminals, and at leas to one pressure sensing unit, each including a first input terminal, a second input terminal, and a first output terminal, the first input terminal and the second input terminal being connected to different output terminals of the plurality of output terminals of the scanning driving circuit, and while being connected to the at least one pressure sensing unit, each of the different output terminals of the scanning driving circuit is further connected to a different row of pixels of a plurality of rows of pixels via a scanning line to transmit a display signal from the scanning driving circuit to turn on the row of pixels in the display region, the method comprising:
  when the output terminal of the scanning driving circuit connected to the first input terminal of each pressure sensing unit provides a display signal, detecting a first pressure sensing signal on the first output terminal of each pressure sensing unit;
  when the output terminal of the scanning driving circuit connected to the second input terminal of each pressure sensing unit provides a display signal, detecting a second pressure sensing signal on the first output terminal of each pressure sensing unit; and
  based on the first pressure sensing signal and the second pressure sensing signal, determining a magnitude of a pressure on the display panel,
  wherein the scanning driving circuit includes a plurality of shift register units; the first input terminal and the second input terminal of each pressure sensing unit are connected to a scanning signal output terminal of different shift register units of the plurality of shift register units; and each pressure sensing unit is disposed between different shift register units in the non-display region.

14. The pressure sensing method according to claim 13, wherein each pressure sensing unit further includes a second output terminal and the pressure sensing method further includes:
  when the output terminal of the scanning driving circuit connected to the first input terminal of each pressure sensing unit provides the display signal, detecting a first difference between a signal from the first output terminal and a signal from the second output terminal;

when the output terminal of the scanning driving circuit connected to the second input terminal of each pressure sensing unit provides the display signal, detecting a second difference between the signal from the first output terminal and the signal from the second output terminal; and based on the first and the second difference, determining the magnitude of the touch pressure.

\* \* \* \* \*